United States Patent [19]

Frisbee

[11] Patent Number: 4,572,302
[45] Date of Patent: Feb. 25, 1986

[54] HOSE CLAMP ASSEMBLY WITH CABLE SUPPORT

[75] Inventor: Claude M. Frisbee, Bettendorf, Iowa

[73] Assignee: J. I. Case Company, Racine, Wis.

[21] Appl. No.: 616,914

[22] Filed: Jun. 4, 1984

[51] Int. Cl.$^4$ .............................................. B05B 15/06
[52] U.S. Cl. ..................................... 172/813; 248/75; 248/52; 248/68.1; 280/421; 137/355.17
[58] Field of Search .................... 248/68.1, 63, 60, 51, 248/52, 75; 280/421, 422; 172/813; 137/355.17

[56] References Cited

U.S. PATENT DOCUMENTS

| | | | |
|---|---|---|---|
| 3,023,989 | 3/1962 | White | 248/68.1 |
| 3,650,545 | 3/1972 | Freed | 248/51 |
| 3,872,881 | 3/1975 | Miller | 248/68.1 |
| 3,885,816 | 5/1975 | Miller | 280/421 |
| 4,111,268 | 9/1978 | Frisbee | 172/813 |
| 4,358,082 | 11/1982 | Reeves | 248/68.1 |

Primary Examiner—Richard J. Johnson
Attorney, Agent, or Firm—Dressler, Goldsmith, Shore, Sutker & Milnamow

[57] ABSTRACT

A clamp assembly is provided for holding one or more flexible fluid lines or hoses of a material handling device wherein fluid hoses extend between the body of the device and an implement movably mounted thereon. The arrangement includes a clamp assembly fitted to the one or more flexible fluid hoses, and further includes a flexible linkage preferably comprising a flexible cable which extends between and is connected to the body of the device and its movable implement. The clamp assembly is configured such that it receives the flexible cable therethrough, and is freely movable along the cable. By this arrangement, desired support and restraint of fluid hoses are provided while avoiding undesired tangling or kinking of the hoses.

9 Claims, 3 Drawing Figures

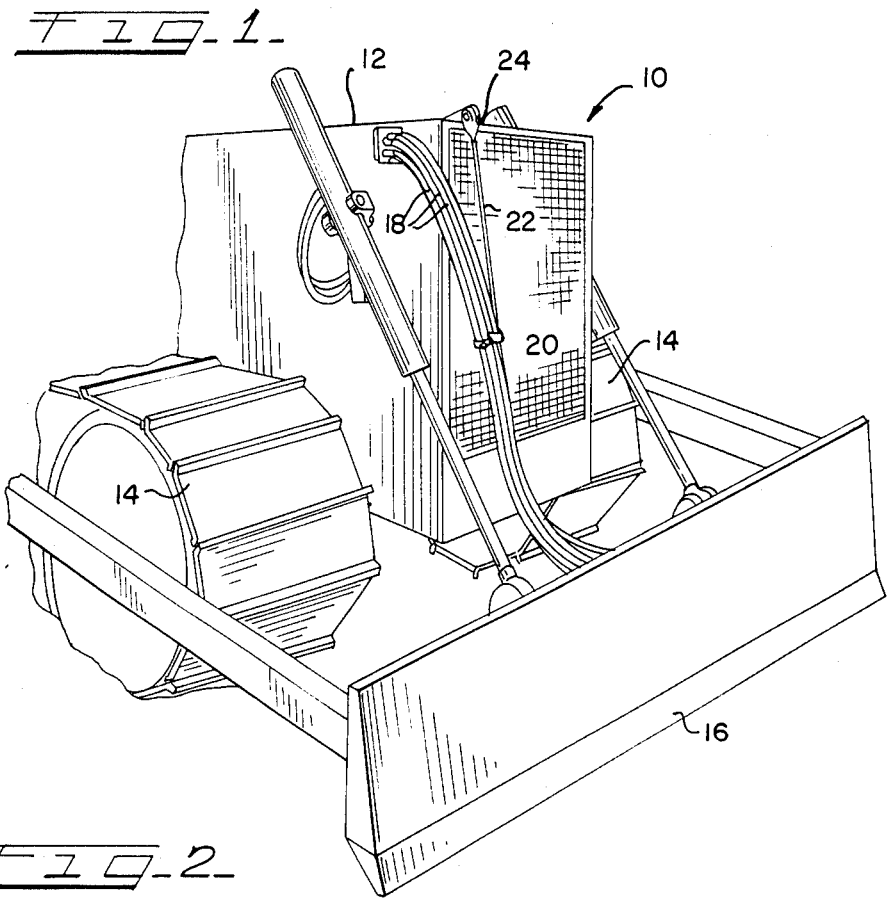
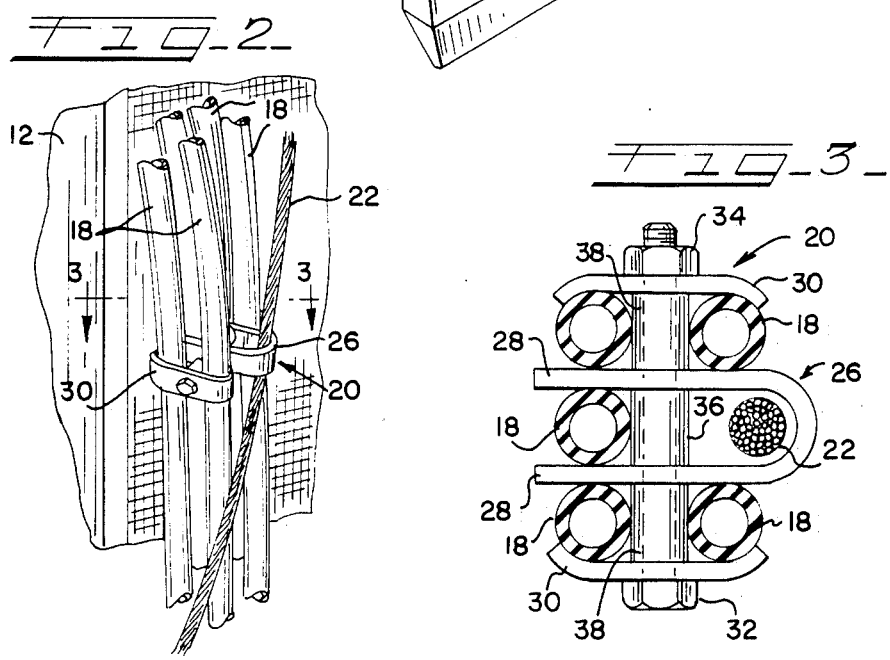

HOSE CLAMP ASSEMBLY WITH CABLE SUPPORT

TECHNICAL FIELD

The present invention relates generally to a hose clamp arrangement for material handling equipment and the like, and more particularly to a clamp assembly which is movably supported on a flexible cable which extends between the body of a material handling device and a movable implement of the device.

BACKGROUND OF THE INVENTION

Material handling devices such as bulldozers, tractors, and like equipment typically include pressurized hydraulic fluid systems for effecting various material handling operations. Hydraulic fluid lines are typically employed for routing the pressurized hydraulic fluid to and from the various hydraulic fluid motors or rams of the device. Flexible fluid lines or hoses are employed for the routing of hydraulic fluid to movable implements of the device, such as a dozer blade, backhoe or similar implement.

In some instances, a number of separate hydraulic fluid hoses must be routed to the movable implement of the material handling device. For example, some dozer blade arrangements include hydraulic fluid rams for effecting angling and/or tilting of the dozer blade in addition to the normal up and down movement of the blade. In such arrangements, it is desirable to provide support and restraint of the various hydraulic fluid hoses to avoid tangling or kinking of the hoses since damage may otherwise result. At the same time, any such hose supporting arrangement should be straightforward in construction for durability and ease in servicing the material handling device.

SUMMARY OF INVENTION

In keeping with the above desired goals, the hose clamp assembly embodying the principles of the present invention is desirably straightforward in construction for durability and economy of use, while at the same time providing desired support and restraint for one or more hydraulic fluid lines or hoses which extend between the body of a material handling device and a movable implement of the device. Notably, the arrangement includes a flexible linkage, preferably comprising a flexible cable, which extends between the body of the material handling device and its implement. The clamp assembly of the arrangement is adapted to hold one or more fluid hoses, with the clamp assembly carried by the flexible cable to provide the desired support and restraint of the hoses as the implement is moved.

In the illustrated embodiment, a material handling device comprising a bulldozer is shown, including a body or chassis and a selectively positionable dozer blade movably mounted at the front of the body. At least one fluid line or hose extends between the dozer body and the movable blade and is respectively connected thereto. As in a typical construction, the illustrated embodiment shows a plurality of hydraulic fluid hoses extending between the dozer body and its blade.

As noted, the present invention contemplates that a flexible linkage means preferably comprising a flexible cable is provided which extends generally between the body of the material handling device and its movable implement. The invention further comprises a clamp assembly for holding the one or more hydraulic fluid hoses, with the clamp assembly receiving the flexible cable therethrough such that the clamp assembly is movable with respect to the flexible cable attendant to movement of the dozer blade implement.

In the preferred embodiment, the clamp assembly is of desirably straightforward construction, and comprises a generally U-shaped member having a pair of leg portions. Mechanical fastening means are provided which extend through the leg portions such that the flexible support cable is received and retained within the generally U-shaped member. In the preferred form, one of the hydraulic fluid hoses is further received within the leg portions of the U-shaped member.

So that the clamp assembly can be easily fitted to a plurality of fluid hoses, the assembly preferably further comprises at least one clamp member connected to the mechanical fastening means in spaced relation to the generally U-shaped member. By this construction, at least one further fluid line is held between the clamp member and one leg portion of the generally U-shaped member. Spacing means are provided between the clamp member and the U-shaped member to permit the mechanical fastening means to be securely tightened without undesirably crimping or deforming the one or more fluid hoses held by the clamp member.

In the illustrated embodiment, a pair of the clamp members are provided in respectively spaced relation to the leg portions of the U-shaped member. By this construction, the clamp assembly is configured to receive and support up to five separate hydraulic fluid hoses.

Numerous other features and advantages of the present invention will become readily apparent from the following detailed description, the accompanying drawings, and the appended claims.

BRIEF DESCRIPTION OF THE DRAWINGS

FIG. 1 is a front perspective view of a material handling device comprising a bulldozer having a hose clamp assembly and cable support embodying the principles of the present invention mounted thereon;

FIG. 2 is an enlarged perspective view of the hose clamp assembly and cable support illustrated in FIG. 1; and FIG. 3 is a view taken along line 3—3 of FIG. 2 further illustrating the clamp assembly embodying the present invention.

DETAILED DESCRIPTION

While the present invention is susceptible of embodiment in various forms, there are shown in the drawings and will hereinafter be described a presently preferred embodiment, with the understanding that the present disclosure is to be considered as an exemplification of the invention, and is not intended to limit the invention to the specific embodiment illustrated.

With reference first to FIG. 1, a material handling device 10 is shown which is illustrated as a bulldozer. The dozer 10 includes a body or chassis 12 supported by crawler tracks 14, with a dozer blade 16 movably mounted at the front of the body 12.

It is contemplated that the hose clamp assembly and support arrangement of the present invention be employed for holding one or more flexible fluid lines or hoses which extend between the body of a material handling device and a movable implement of the device. Accordingly, a plurality of hydraulic fluid hoses 18 (five being shown) are illustrated as extending between the body 12 of dozer 10 and the blade 16. The routing of hydraulic fluid hoses in this manner is typically required when a dozer blade such as 16 includes hydraulic fluid motors or rams for effecting adjustable angling and pitch of the blade.

In order to support and restrain the hydraulic fluid hoses 18 attendant to movement of the dozer blade 16, a clamp assembly 20 is provided which receives and holds the hoses 18. Notably, although the clamp assembly 20 is fixedly connected to the hydraulic fluid hoses 18, the clamp assembly is movably supported by a flexible linkage 22, preferably comprising a flexible metal cable, which extends between and is connected to the dozer body 12 and the dozer blade 16. To this end, a suitable clevis 24 pivotally connects one end of the flexible cable 22 to the dozer body, with a like connector being provided for attaching the flexible cable to the dozer blade.

The configuration of the clamp assembly 20 is best illustrated in FIG. 3. It should be noted that while the clamp assembly 20 is illustrated in a configuration which facilitates restraint and support of the five fluid hoses 18 illustrated in the drawings, a clamp assembly embodying the principles disclosed herein may be readily configured to hold fewer than or more than five separate fluid hoses.

Clamp assembly 20 comprises a generally U-shaped member 26 having a pair of leg portions 28. As will be observed, the U-shaped member 26 is dimensioned such that it receives flexible cable 22 therethrough for free movement of the clamp assembly 20 along the flexible cable. As illustrated, the flexible cable 22 is preferably received within the closed end of the U-shaped member 26, while one of the fluid hoses 18 is positioned and held between leg portions 28 generally adjacent to the free ends of the leg portions.

The clamp assembly 20 further preferably includes at least one clamp member 30 positioned in spaced relation to one of the leg portions 28 of the U-shaped member 26. As illustrated, a pair of the clamp members 30 are provided in respectively spaced relation to the leg portions 28. Each of the clamp members 30 is preferably shaped such that its free ends extend generally toward its respective one of the leg portions 28, thus permitting a pair of the flexible fluid hoses 18 to be positioned between each of the clamp members 30 and its respective leg portion 28.

Suitable releasable fastening means are provided for holding the clamp assembly together and in position on the flexible fluid hoses 18. To this end, a mechanical fastener comprising a bolt 32 and a nut 34 threaded thereto is illustrated extending through each of the clamp members 30 and each of the leg portions 28 of the U-shaped member. By this construction, the flexible cable 22 is held within U-shaped member 26 generally between the bolt 32 and the closed end of the member 26, with the one of the fluid hoses 18 held between the leg portions 28 on the opposite side of the mechanical fastener.

While it is desired that the clamp assembly 20 be firmly secured to the flexible fluid hoses 18, it is important that fluid flow through the hoses is not undesirably restricted. Accordingly, suitable spacers are provided to prevent undesired crimping of the fluid hoses 18 attendant to tightening of nut and bolt 32 and 34. An inner spacer 36 is preferably provided on the shank of bolt 32 between the leg portions 28 of U-shaped member 26, while a pair of outer spacers 38 are preferably positioned between each of the clamp members 30 and its respective leg portion 28. By this construction, the desired spacing is established between the leg portion 28 and between each clamp member 30 and its respective leg portion 28 to securely connect the clamp assembly to the fluid hoses 18 without undesirably constricting the hoses.

From the foregoing, it will be observed thus numerous modifications and variations can be effected without departing from the true spirit and scope of the novel concept of the present invention. It will be understood that no limitation with respect to the specific embodiment illustrated is intended or should be inferred. It is, of course, intended to cover by the appended claims all such modifications as fall within the scope of the claims.

What is claimed is:

1. A clamp assembly for a material handling device having a body, a movable implement attached thereto, and at least one fluid hose extending therebetween, comprising:
   flexible linkage means extending between said material handling device body and said movable implement with opposite ends of said flexible linkage means respectively connected to said body and to said movable implement; and
   clamp means for holding said fluid hose in substantially fixed relation to said clamp means, said clamp means receiving said flexible linkage means therethrough such that said clamp means is freely movable with respect to said flexible linkage means attendant to movement of said implement whereby said clamp means supports said fluid hose.

2. The clamp assembly of claim 1, wherein said flexible linkage means comprises a cable extending between and connected to said body and said implement.

3. The clamp assembly of claim 1, wherein said clamp means comprises a generally U-shaped member having a pair of leg portions, and fastening means extending between said leg portions, such that said flexible linkage means is received through said generally U-shaped member, and said U-shaped member holds said fluid hose.

4. The clamp assembly of claim 1, wherein said clamp means is adapted to hold a plurality of said fluid hoses.

5. A clamp assembly for a material handling device having a body, a movable implement attached thereto, and at least one fluid hose extending therebetween, comprising:
   flexible linkage means extending generally between said material handling device body and said movable implement; and
   clamp means for holding said fluid hose, said clamp means receiving said flexible linkage means therethrough such that said clamp means is movable with respect to said flexible linkage means attendant to movement of said implement,
   said clamp means comprising a generally U-shaped member having a pair of leg portions, and fastening means extending between said leg portions, such that said flexible linkage means is received through said generally U-shaped member, and said U-shaped member holds said fluid hose,
   said clamp means further comprising at least one clamp member connected to said fastening means in spaced relation to said generally U-shaped member such that at least one further fluid hose is held between said clamp member and one leg portion of said generally U-shaped member.

6. The clamp assembly of claim 5, including spacing means disposed between said clamp member and said one leg portion of said U-shaped member.

7. A clamp assembly for a material handling device having a body, a dozer blade implement movably mounted generally at the front of said body, and a plurality of fluid hoses extending between said body and said dozer blade, comprising:
flexible cable means extending between said body of said material handling device and said dozer blade;
a generally U-shaped member having a pair of leg portions, said U-shaped member receiving said flexible cable means therethrough;
at least one clamp member spaced from one of the leg portions of said generally U-shaped member; and
fastening means extending through said pair of leg portions and said one clamp member such that said U-shaped member is retained on said flexible cable means and is movable thereon, and at least one of said fluid hoses is held between said clamp member and said one leg of said U-shaped member.

8. The clamp assembly of claim 7, including spacing means disposed between said clamp member and said one leg of said U-shaped member.

9. The clamp assembly of claim 7, wherein said assembly includes a pair of said clamp members spaced from respective ones of said leg portions, said fastener means extending through said clamp members whereby said assembly holds at least a pair of said fluid hoses respectively between each said clamp member and its respective one of said leg portions.

* * * * *